United States Patent [19]

Baldwin

[11] 4,175,655
[45] Nov. 27, 1979

[54] PANEL TURNER
[75] Inventor: Arthur M. Baldwin, Cordova, S.C.
[73] Assignee: Champion International Corporation, Stamford, Conn.
[21] Appl. No.: 891,066
[22] Filed: Mar. 29, 1978
[51] Int. Cl.$^2$ .................................................. B65G 47/24
[52] U.S. Cl. .................................... 198/403; 271/186; 414/759
[58] Field of Search ............... 198/403, 374, 394, 399; 214/1 QA, 1 Q; 271/186, 65; 270/58

[56] References Cited
U.S. PATENT DOCUMENTS
3,967,723  7/1976  Beckham ............................ 198/403

Primary Examiner—Robert B. Reeves
Assistant Examiner—Douglas D. Watts
Attorney, Agent, or Firm—Evelyn M. Sommer

[57] ABSTRACT

An apparatus for inverting a panel member comprises a conveyor having a plurality of spaced-apart, substantially parallel endless belts; a frame member including first and second pairs of opposed uprights disposed above and enclosing the conveyor; a panel raising mechanism pivotally connected to the frame above the conveyor; and a panel lowering mechanism pivotally connected to the frame above the conveyor. The panel raising mechanism includes a transverse bar rotatably mounted above the conveyor on the second pair of opposed frame uprights. The mechanism further includes a plurality of spaced-apart extension members which are rigidly connected to the transverse bar. A roller is rotatably connected to the free end of each of the extension members, the rollers being spaced apart from each other such that each of them can fit in the space between adjacent endless belts. The panel lowering mechanism which is pivotally mounted on the first pair of frame uprights is substantially identical in structure to the panel raising mechanism. The panel raising and panel lowering rollers are pivoted about their respective transverse bars above and below the conveyor by a cam-lever assembly. The cam-lever assembly coordinates the operation of the panel raising and lowering mechanisms such that when the leading edge of the panel initially engages the panel raising mechanism the rollers thereof are disposed below the conveyor while the panel lowering rollers are disposed above the conveyor. When the panel raising mechanism has raised the panel to a vertical position, the panel raising rollers and the panel lowering rollers are both disposed above the conveyor. When the panel lowering mechanism moves the leading edge of the panel back onto the conveyor the panel lowering rollers are disposed below the conveyor while the panel raising rollers are disposed above the conveyor. When the cam has completed a complete cycle, the rollers reassume the panel receiving position.

12 Claims, 6 Drawing Figures

PANEL TURNER

BACKGROUND OF THE INVENTION

The subject invention relates to an apparatus for inverting sheets of material such as boards, glass plates, metal sheets, etc., and is primarily designed for use in connection with particle boards, wood panels and the like. During the course of the production of such panels it is often necessary that work be done to both sides of the panel, and thus, it is necessary that the panels be inverted during the manufacturing process. There are several sheet handling or board inverter type apparatuses now in use, but said apparatuses have several shortcomings. In some of the known apparatuses, the board tends to become chipped, soiled, scuffed or blemished, as it is inverted, thus detracting from the appearance and salability of the board. Other apparatuses which attempt to prevent this type of damage are quite complex in structure, and expensive, thus mandating an undesirable passing off of the high costs of the apparatus to the purchaser of the manufactured wood panel.

Accordingly, it is an object of the subject invention to provide an apparatus for inverting board-like material which is simple in construction and relatively easy to manufacture, and which is positive and reliable in operation and capable of handling panels without damage thereto.

SUMMARY OF THE INVENTION

In accordance with the subject invention an apparatus for inverting a panel member comprises a conveyor for transporting the panel in a horizontal direction, the conveyor including a plurality of spaced apart substantially parallel endless belts. The apparatus also includes a frame member having first and second pairs of opposed uprights which enclose the conveyor, portions of the uprights being disposed above the conveyor. The apparatus further includes a panel raising mechanism for engaging the leading edge of the panel as it moves along the conveyor. The panel raising mechanism includes a transverse bar rotatably mounted above the conveyor on the second pair of opposed frame uprights. A plurality of spaced apart extension members is rigidly connected to the transverse bar. Preferably the extension members extend radially from the transverse bar and are substantially parallel to one another. Roller means are rotatably connected to the free end of each of the extension members, the roller means being spaced apart from each other so that each of them can fit in the space between adjacent conveyor belts. The apparatus further includes a panel lowering mechanism for engaging the leading edge of the panel after it has been raised passed the vertical. The panel lowering mechanism includes a transverse bar rotatably mounted above the conveyor on the first pair of opposed frame uprights. A plurality of spaced apart extension members is rigidly connected to the transverse bar. Preferably, the extension members radially extend from the transverse bar and are substantially parallel to each other. Roller means are rotatably connected to the free end of each extension member, the roller means being spaced apart from each other such that each can fit in the space between adjacent conveyor belts. Preferably, damping means is included on the panel raising and lowering mechanisms so as to minimize undesirable oscillations thereof. The apparatus further includes means separate from the panel for pivoting the panel raising rollers and the panel lowering rollers about their respective transverse bars above and below the conveyor, and means for coordinating the respective operation of the panel raising rollers and the panel lowering rollers. Preferably, this pivoting and coordinating means takes the form of a cam-lever assembly. More particularly, the apparatus includes a cam plate that is rotatably connected to the frame. The cam plate includes an outer face and an inner face with each face having its own cam groove. A plurality of levers is connected between the inner face of the cam plate and the transverse bar of the panel raising mechanism. Similarly, a plurality of pivotally connected levers is connected between the outer face of the cam plate and the transverse bar of the panel raising mechanism. As the cam plate rotates the desired pivoting motion is imparted to the panel raising and panel lowering mechanisms via their respective levers which follow their own particularly designed cam groove on the inner and outer surfaces of the cam plate. The apparatus further includes means responsive to the presence of the panel for actuating a complete cycle of the cam plate. Typically, this means may comprise a pivotally mounted limit switch.

In operation, a board or panel moves along the conveyor belt and at a certain point contacts the limit switch which actuates the rotation of the cam plate. At this point, the apparatus is in the panel receiving position with the panel raising rollers being disposed underneath the upper runs of the conveyor belts, while the panel lowering rollers are disposed above the conveyor. As the cam plate rotates, the panel raising rollers are pivoted above the conveyor and engage the leading edge of the panel, thus raising it. As the leading edge of the panel is raised, the trailing edge of the panel continues to move along on the conveyor belts. As the panel raising mechanism pivots upwardly above the conveyor, the panel lowering mechanism, due to the particular design of its cam groove, remains motionless above the conveyor. At the point when the panel has been raised passed the vertical, the rollers of the panel lowering mechanism engages the leading edge of the panel. As the cam plate continues to rotate, the panel lowering rollers begin to pivot downwardly towards the conveyor while the panel raising rollers remain stationary above the conveyor. The panel lowering rollers continue to pivot in a downward motion until they are disposed underneath the upper runs of the conveyor belts. At this point, the panel has been completely inverted and lies flush against the conveyor belt, after which it is moved to another treatment area. As the cam plate completes its rotational cycle, the panel lowering rollers are pivoted upwards and the panel raising rollers are pivoted downwards so that they reassume the initial panel receiving position.

DETAILED DESCRIPTION OF THE PREFERRED EMBODIMENTS

Figure 1:
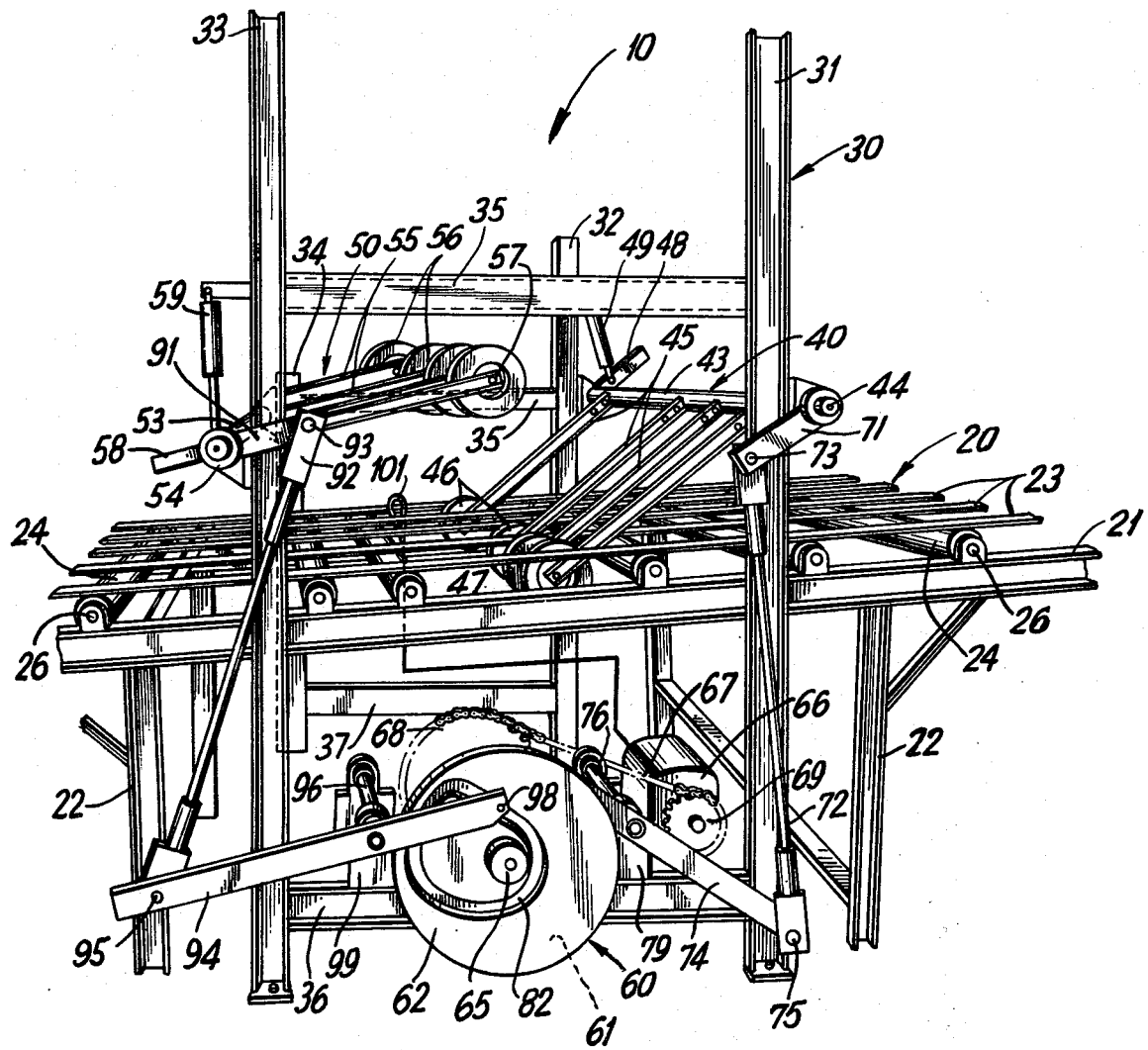
FIG. 1 is a perspective view of the apparatus of the subject invention.
Figure 2:
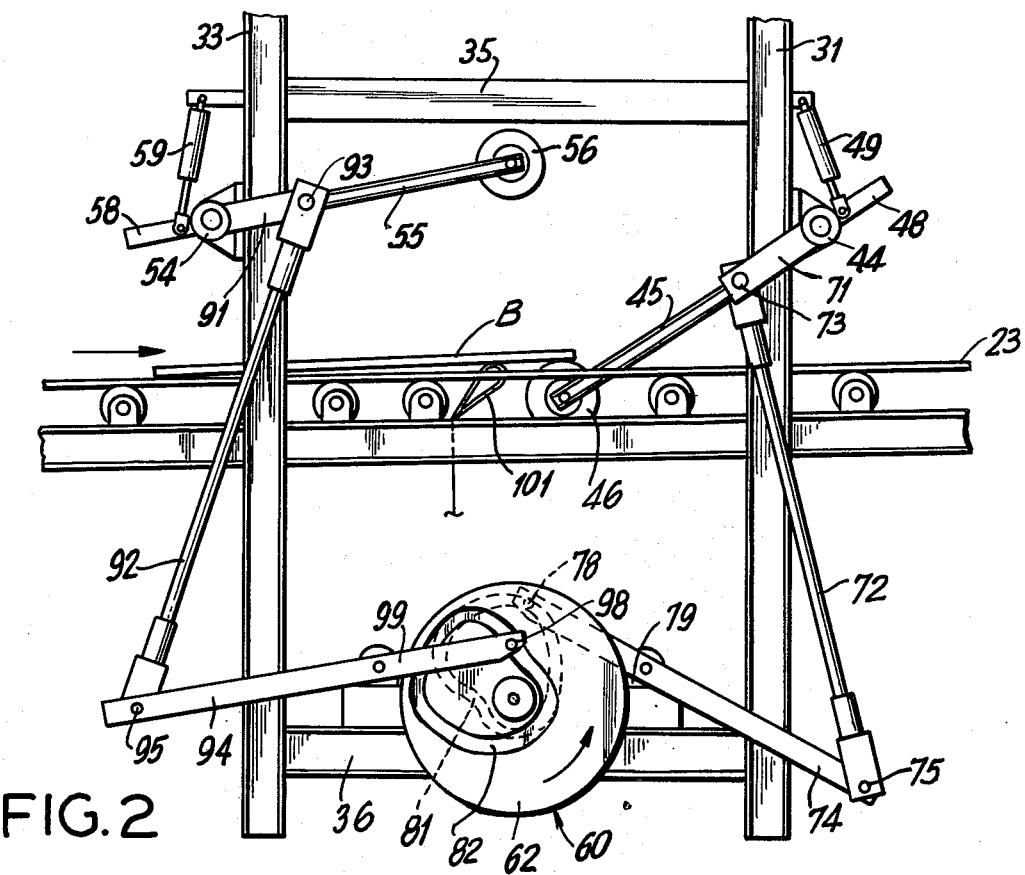
FIGS. 2-6 are elevational views of the apparatus of the subject invention and illustrate in sequence how a panel is inverted from one face to another.
Figure 3:
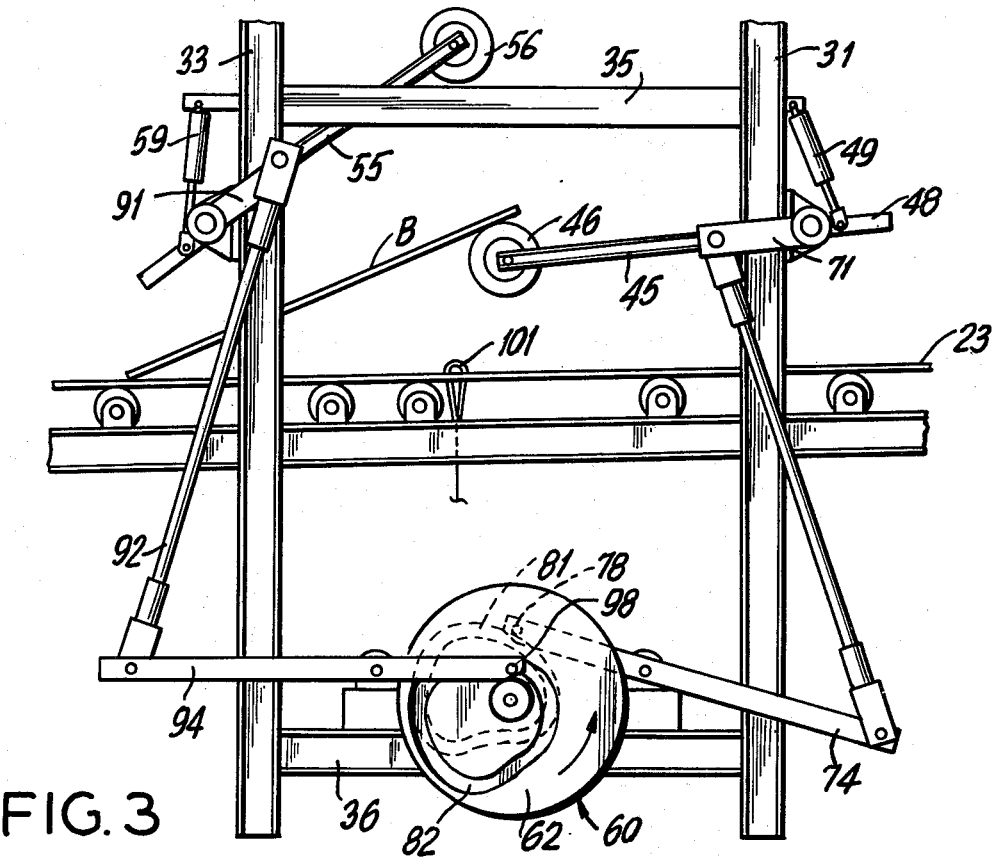
Figure 4:
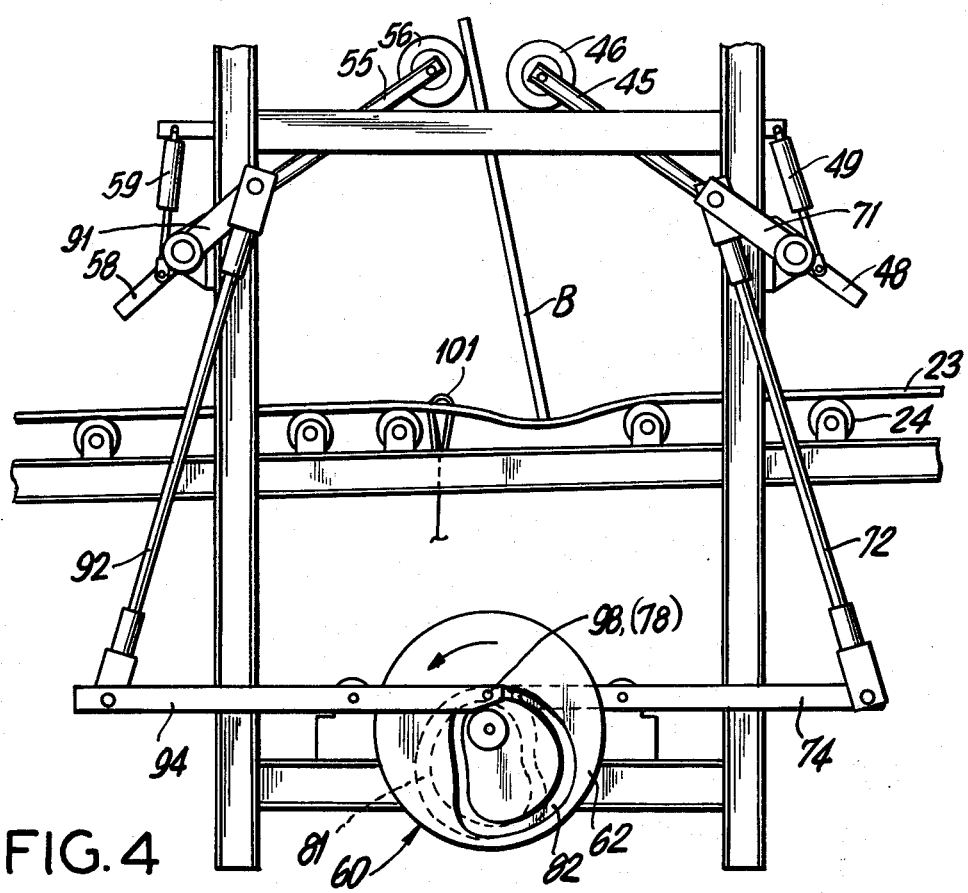

Referring to FIG. 1, the panel turning apparatus of the subject invention is designated by reference numeral 10 and basically includes a conveyor 20, a frame member 30, a panel raising mechanism 40, and a panel lowering mechanism 50.

The conveyor 20 comprises longitudinally extending side rails 21 supported on legs 22. Conveyor 20 further comprises a plurality of longitudinal parallel endless belts 23 which are disposed about idler rollers 24 rotatably connected to side rails 21 in bearings 26. The belts form a firm flat conveyor for the boards or panels, and are driven by suitable drive means (not shown).

Frame member 30 of the subject apparatus includes uprights 31-34 having upper support cross rails 35. In addition, frame 30 includes bottom support rails 36 and 37 for supporting a motor-cam assembly to be described below.

Further referring to FIG. 1, one end of the panel raising mechanism 40 of the subject apparatus comprises a transverse bar 43 which is disposed above conveyor 20 and is rotatably mounted to frame uprights 31 and 32 in bearings 44. The panel raising member 40 further includes a plurality of spaced-apart extension rods 45 which are rigidly connected to transverse bar 43. Preferably rods 45 extend radially from transverse bar 43, and are substantially parallel to each other. A plurality of roller members 46 is rotatably mounted to the free ends of radially extending rod members 45 by means of pins 47. Preferably, rollers 46 are made from flexible material such as rubber so as not to cause damage to a board as it comes into contact therewith. It should be noted that rod members 45 and roller members 46 attached thereto are spaced such that they can fit in the spaces between endless belts 23. Thus, roller members 46 can take a position beneath the upper runs of the endless belts 23.

Further referring to FIG. 1, a panel lowering mechanism 50 of the subject apparatus is similar in structure to the panel raising mechanism 40. More particularly, panel lowering mechanism 50 comprises a transverse bar 53 which is disposed above conveyor 20 and is rotatably mounted to frame uprights 33 and 34 in bearings 54. The lowering mechanism 50 further comprises a plurality of spaced-apart extension rods 55 which are rigidly connected to transverse bar 53. Preferably, rods 55 extend radially from bar 53, and are substantially parallel to each other. Roller members 56 are rotatably connected to the free end of rods 55 by pins 57. As with rollers 46 it is preferably that rollers 56 be made from a material that will not cause damage to the board when they come into contact therewith. In addition, it is preferably that the rods 55 of the panel lowering mechanism 50 be spaced from each other so that the rollers 56 attached thereto can fit into the spaces between endless belts 23. Thus, at appropriate times during the panel inverting process the rollers 56 can be disposed below the upper runs of the endless belts 23.

As will be described in detail below, the panel raising and lowering mechanisms pivot about their respective transverse bars 43 and 53, thus raising and lowering their respective rollers 46 and 56 above and below the upper runs of the endless belts 23. As will also be described below, this raising and lowering of each set of rollers 46 and 56 must be particularly timed to achieve the desired panel inversion. The means for effecting this operation is a cam-lever assembly. More particularly, the subject apparatus 10 includes a cam plate 60 which is mounted on a shaft 65, said shaft being suitably connected to the frame. Shaft 65 is also connected to a driving motor 66 through chain 67 and sprocket wheels 68 and 69. Cam plate 60 has an outer face 62 and an inner face 61, each of said faces having a particularly designed cam groove 82 and 81, respectively (see FIGS. 2-6). The panel raising and lowering mechanisms of the subject apparatus are each connected to a face of cam plate 60 by a set of levers such that as cam plate 60 rotates the appropriate motion is imparted to the respective panel raising and lowering mechanisms.

Specifically referring to panel lowering mechanism 50, a link member 91 is rigidly connected at one end to transverse bar 53, such that as link member 91 rotates so does transverse bar 53. Preferably link member 91 is disposed substantially parallel to radially extending members 55. A lever 92 is pivotally connected to the other end of link 91 by pivot pin 93. The other end of lever 92 is pivotally connected to a cam lever 94 by a pivot pin 95. Cam lever 94 includes at its opposite end a cam follower 98 that is disposed in cam groove 82. As cam plate 60 rotates, cam follower 98 transverses the path of groove 82, and while so doing, imparts the desired motion to the panel lowering mechanism 50 through levers 92 and 94 and link 91. It will be noted that in the preferred embodiment of the subject invention cam-lever 94 is pivotally connected to the frame 30 so as to prevent any undesirable lateral movement, i.e. in a direction normal to the face plane of cam plate 60. Accordingly, as illustrated in the figures, cam-lever 94 is pivotally connected to a shaft 96 which is disposed in bearing support 99, the collars being rigidly connected to the frame.

Similarly, with respect to panel raising mechanism 40, a link member 71 is rigidly connected at one end to transverse bar 43 such that as link member 71 rotates, so does transverse bar 43. Preferably, link 71 is disposed substantially parallel to radially extending members 45. A lever 72 is pivotally connected to the other end of link 71 by a pivot pin 73. In addition, a cam lever 74 is pivotally connected to the other end of lever 72 by a pivot pin 75. Cam-lever 74 includes at its other end a cam follower 78 (see FIGS. 2-6) that is disposed in cam groove 81. As cam plate 60 rotates, cam follower 78 transverses the particularly designed path of groove 81, and while so doing, imparts motion to the panel raising mechanism 40. As above described relative to the panel lowering mechanism 50, it is preferable that cam-lever 74 be pivotally connected to frame 30 so as to prevent undesirable lateral movement. Accordingly, cam-lever 74 is pivotally connected to a shaft 76 which is disposed in bearing supports 79 the collars being rigidly connected to the frame.

It should be noted that in addition to preventing the lateral movement of the respective sets of levers of the subject apparatus it is also preferably that there be included a damping means for preventing unwanted oscillation in the panel raising and lowering mechanism during the panel inversion procedure. Accordingly, referring first to the panel raising mechanism 40, an extension member 48 is rigidly connected to bar member 43 at the end thereof opposite link 71. Preferably, extension member 48 is substantially parallel to radially extending members 45. A lifting and damping member 49 which may be an air cylinder is pivotally connected at one end to extension member 48. The other end of air cylinder 49 is rigidly connected to upright 32 of frame 30. Member 49 functions to aid in the lifting of the panel and to dampen undesired vibrations thereof.

Similarly, with respect to panel lowering mechanism 50, an extension member 58 is rigidly connected to bar member 53 on the end thereof opposite link 91. Preferably, extension member 58 is disposed substantially parallel to radially extending members 55. A damping member 59 is pivotally connected at one end to extension member 58. The other end of damping member 59 is rigidly connected to upright 34 of frame 30.

Referring now to FIGS. 2-6, there is illustrated the operation of the subject panel inverting apparatus. Specifically referring to FIG. 2, the subject apparatus is in the panel receiving position. As illustrated in the figure, in the panel receiving position, the rollers 56 of the panel lowering mechanism 50 are disposed above the conveyor while the rollers 46 of the panel raising mechanism 40 are disposed below the upper runs of endless belts 23. As a panel or board B travels along the conveyor it engages a limit switch 101 which is pivotally mounted to the conveyor (see FIG. 1). When the leading edge of the board B strikes the switch, the switch pivots to a position underneath belts 23 thus permitting the board to continue in its passage along the conveyor. Motor 66 runs continuously, and switch 101 functions to release an air brake (not shown) coupled to the cam plate. At the same time, an air clutch is energized by switch 101 and motor 66 is operative to rotate cam plate 60 for one complete rotation of 360°. At this time, the rollers 46 are under the leading edge of the board. Thus, referring to FIG. 4, it can be seen that as cam plate 60 rotates in a counterclockwise direction rollers 46 raise the leading edge of the board through levers 72, 74, link 71, and transverse bar 43 while the trailing edge of the board continues to move along belts 23. It should be noted that through the above-described rotation of cam plate 60 no motion has been imparted to panel lowering mechanism 50 which thus far has remained at its initial position high above the conveyor. This lack of motion results from the particular configuration of camming groove 82. It should be further noted that because rollers 46 are free to rotate around pins 47 they do not cause any damage to the board as it is being raised.

Figure 5:
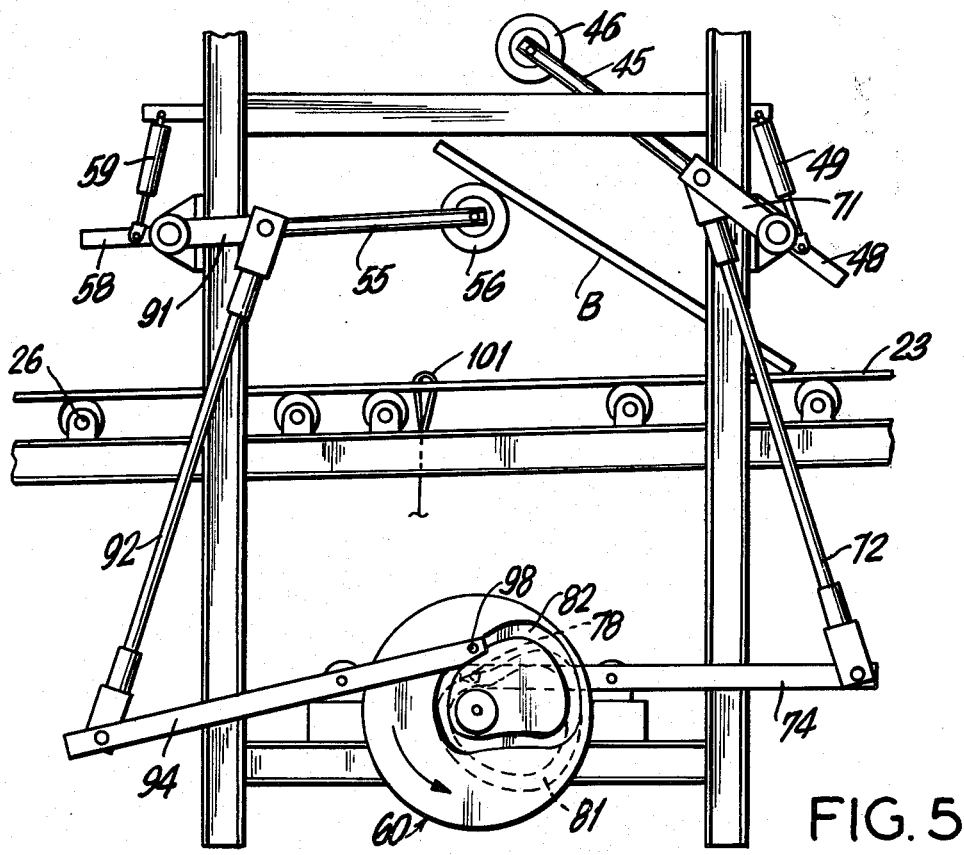

Referring to FIG. 5, the board B has been raised to a point passed the vertical whereupon the force of gravity in combination with the movement of the trailing edge of the board along the conveyor causes the leading edge of the board to rest against rollers 56 of the panel lowering mechanism 50. It should be noted, as illustrated in FIG. 5, that endless belts 23 are quite flexible thus preventing damage to the fragile edge of the board.

Figure 6:
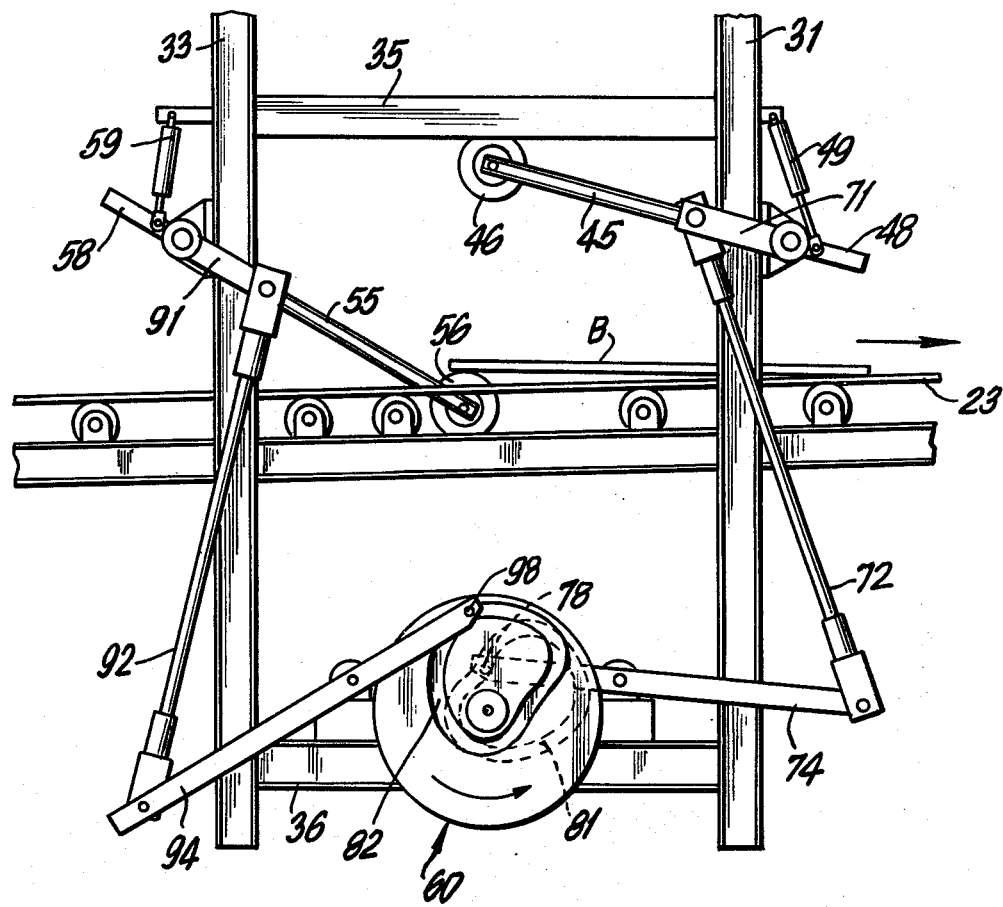

Referring to FIG. 6, cam plate 60 is continuing in its counterclockwise rotation, and attendant therewith, the board is being lowered by rollers 56 through levers 92, 94, link 91 and transverse bar 53.

Referring to FIG. 7, the rotation of cam plate 60, together with the action of levers 92, 94, link 91 and transverse bar 53, places rollers 46 below the upper runs of belts 23 thus very gently depositing the inverted board onto the conveyor for proceeding to stacking or other treatment.

It should be noted that during the panel lowering procedure, (FIGS. 5, 6, and 7) panel raising rollers 46 do not move but remain in the raised position above the conveyor. This lack of motion is due to the particular design of cam groove 81 which dictates the motion of levers 74, 72, link 71, bar 43 and ultimately rollers 46. It should be further noted that because rollers 56 are free to rotate around pins 57 they cause no damage to the board during the panel lowering procedure.

As the cam plate 60 completes its 360° rotation, roller members 46 and 56 are lowered and raised, respectively, to their original positions illustrated in FIG. 1.

In summary, the subject invention provides an apparatus for inverting a panel member which is quite simple in construction and inexpensive to manufacture. The apparatus while being simple is very reliable and minimizes the possible damage to the panel during the inversion procedure.

While the preferred embodiment of the subject invention has been described and illustrated, it would be obvious that various changes and modifications can be made therein without departing from the spirit of the invention which should be limited only by the scope of the appended claims.

What is claimed is:

1. An apparatus for inverting a panel member comprising: a conveyor for transporting the panel in a horizontal direction, said conveyor including a plurality of spaced apart substantially parallel endless belts;

a frame member including first and second pairs of opposed uprights disposed above the conveyor and enclosing said conveyor;

a panel raising mechanism for engaging the leading edge of the panel as the panel moves along the conveyor, said panel raising mechanism including a transverse bar rotatably mounted above the conveyor on the second pair of opposed frame uprights, a plurality of spaced apart extension members rigidly connected to said transverse bar, and roller means rotatably connected to the free end of each of said extension members, said roller means being spaced apart from each other such that each of said roller means can fit in the space between the adjacent conveyor belts;

means separate from the panel for pivoting said panel raising rollers about their respective transverse bar above and below the conveyor comprising:

a cam plate rotatably mounted on a shaft connected to the frame, said shaft being connected to a driving motor, one surface of said cam plate having a cam surface, said means further including a link member rigidly connected at one end to the panel raising transverse bar, the other end of said link member being pivotally connected to an extension lever, a cam lever pivotally connected at one end to the other end of said extension lever, the other end of said cam lever including a cam follower, said cam follower engaging the cam surface of the cam plate such that as the cam plate rotates the cam follower transverses the path of the cam surface and imparts a pivoting motion to the panel raising mechanism through the cam lever, the extension lever, and the link member connected thereto;

a panel lowering mechanism for engaging the leading edge of the panel after the panel has been raised past the vertical, said panel lowering mechanism including a transverse bar rotatably mounted above the conveyor on the first pair of opposed frame uprights, a plurality of spaced apart extension members rigidly connected to said transverse bar, and roller means rotatably connected to the free end of each extension member, said roller means being spaced apart from each other such that each can fit in the space between adjacent conveyor belts, said panel lowering mechanism being disposed opposite said panel raising mechanism such that the extension members of said mechanisms extend towards each other;

means separate from the panel for pivoting said panel lowering rollers about their respective transverse bar above and below the conveyor;

means responsive to the presence of the panel for actuating said apparatus; and a means separate from said panel for coordinating said panel raising and lowering mechanisms such that when the leading edge of the panel first engages the panel raising mechanism the rollers of said panel raising mechanism are disposed below the conveyor and the rollers of the panel lowering mechanism are disposed above the conveyor, and such that when the panel raising mechanism has raised the panel to a vertical position the rollers of both the panel raising and panel lowering mechanisms are disposed above the conveyor, and such that when the panel lowering mechanism deposits the leading edge of the panel back onto the conveyor the rollers of said panel lowering mechanism are disposed below the conveyor while the panel raising rollers are disposed above the conveyor.

2. An apparatus for inverting a panel member as recited in claim 1 in which the respective spaced apart extension members of the panel raising and lowering mechanisms radially extend from their respective transverse bar and are substantially parallel to each other.

3. An apparatus for inverting a panel as recited in claim 1 which further includes first and second damping means for preventing oscillations as the panel raising and lowering mechanisms pivot about their respective transverse bars, said first damping means also functioning to aid in the lifting of the panel member and being pivotally connected at one end of the panel raising transverse bar, the other end of the first damping means being rigidly connected to one of the second pair of frame uprights, said second damping means being pivotally connected at one end of the panel lowering transverse bar, the other end of said second damping means being rigidly connected to one of the first pair of frame uprights.

4. An apparatus for inverting a panel as recited in claim 1 in which the roller means of said panel raising and panel lowering mechanisms are made from a resilient, scuff proof material.

5. An apparatus for inverting a panel member as recited in claim 1 in which the cam lever is pivotally connected to the frame so as to prevent movement of the cam lever in a direction normal to the surface of the cam plate.

6. An apparatus for inverting a panel as recited in claim 1 in which the extension members of the panel raising mechanism are offset from their respective opposing panel lowering mechanism extension members.

7. An apparatus for inverting a panel as recited in claim 1 in which the means responsive to the presence of the panel for actuating the apparatus comprises a limiting switch which is pivotally mounted on the conveyor, said limiting switch being connected to a drive motor.

8. An apparatus for inverting a panel member as recited in claim 1 in which the means separate from the panel for pivoting said panel raising mechanism and said panel lowering mechanism, and said means separate from the panel for coordinating the operation of said panel raising mechanism and panel lowering mechanism comprises a cam plate rotatably mounted on a shaft connected to the frame, said shaft further being connected to a drive motor, said cam plate having an inner and outer surface, the inner surface of said cam plate including a first cam surface, said pivoting and coordinating means further including a first link member rigidly connected at one end to the transverse bar of the panel raising mechanism, the other end of said link member being pivotally connected to a first extension lever, a first cam lever being pivotally connected to the other end of said first extension lever, the other end of said first cam lever including a first cam follower engaging the first cam surface on the inner face of said cam plate, the outer face of said cam plate including a second cam surface, said pivoting and coordinating means further including a second link member rigidly connected at one end to the transverse bar of the panel lowering mechanism, the other end of said link member being pivotally connected to a second extension lever, a second cam lever being pivotally connected to said second extension lever, the other end of said second cam lever including a second cam follower engaging said second cam surface on the outer surface of the cam plate such that as the cam plane rotates the cam followers traverse their respective cam surfaces on the inner and outer surfaces of the cam plate, thus imparting the coordinated pivoting action to the panel raising mechanism and the panel lowering mechanism.

9. An apparatus for inverting a panel as recited in claim 1 in which the panel raising mechanism and the panel lowering mechanism are disposed relative to each other such that as the panel moves along the conveyor it passes the panel lowering mechanism before it engages the panel raising mechanism.

10. An apparatus for inverting a panel member comprising:

a conveyor for transporting the panel in a horizontal direction, said conveyor including a plurality of spaced apart substantially parallel endless belts;

a frame member including first and second pairs of opposed uprights disposed above the conveyor and enclosing said conveyor;

a panel raising mechanism for engaging the leading edge of the panel as the panel moves along the conveyor, said panel raising mechanism including a transverse bar rotatably mounted above the conveyor on the second pair of opposed frame uprights, a plurality of spaced apart substantially parallel extension members radially extending from said transverse bar, and roller means rotatably connected to the free end of each of said extension members, said roller means being spaced apart from each other such that each of said roller means can fit in the space between the adjacent conveyor belts;

a panel lowering mechanism for engaging the leading edge of the panel after the panel has been raised past the vertical, said panel lowering mechanism including a transverse bar rotatably mounted above the conveyor on the first pair of opposed frame uprights, a plurality of spaced apart substantially parallel extension members radially extending from said transverse bar, and roller means rotatably connected to the free end of each extension member, said roller means being spaced apart from each other such that each can fit in the space between adjacent conveyor belts, said panel lowering mechanism being disposed opposite said panel raising mechanism such that the extension members of said mechanisms extend towards each other, said panel raising and lowering mechanisms being further disposed relative to the conveyor such that as the panel moves along the conveyor it passes the panel lowering mechanism before it is engaged by the panel raising mechains, the extension members of the panel raising mechanism being offset from their respective opposing panel lowering mechanism extension members;

drive means separate from the panel for actuating said panel raising mechanism and said panel lowering mechanism, and for coordinating the operation of said panel raising mechanism and panel lowering mechanism, said drive means including a cam plate rotatably mounted on a shaft connected to the frame, said shaft further being connected to a drive motor, said cam plate having an inner and outer surface, the inner surface of said cam plate including a first cam surface, said pivoting and coordinating means further including a first link member rigidly connected at one end to the transverse bar of the panel raising mechanism, the other end of said link member being pivotally connected to a first extension lever, a first cam lever being pivotally connected to the other end of said first extension lever, the other end of said first cam lever including a first cam follower engaging the first cam surface on the inner face of said cam plate, the outer face of said cam plate including a second cam surface, said pivoting and coordinating means further including a second link member rigidly connected at one end to the transverse bar of the panel lowering mechanism, the other end of said link member being pivotally connected to a second extension lever, a second cam lever being pivotally connected to said second extension lever, said first and second cam levers being pivotally connected to the frame for preventing movement of said levers in a direction normal to the face of the cam plate, the other end of said second cam lever including a second cam follower engaging said second cam surface on the outer surface of the cam plate such that as the cam plate rotates the cam followers traverse their respective cam surfaces on the inner and outer surfaces of the cam plate such that when the leading edge of the panel first engages the panel raising mechanism the rollers of said panel raising mechanism are disposed below the conveyor and the rollers of the panel lowering mechanism are disposed above the conveyor, and such that when the panel raising mechanism has raised the panel to a vertical position the rollers of both the panel raising and panel lowering mechanisms are disposed above the conveyor, and such that when the panel lowering mechanism deposits the leading edge of the panel back onto the conveyor the rollers of said panel lowering mechanism are disposed below the conveyor while the panel raising rollers are disposed above the conveyor;

first and second damping means for preventing oscillations as the panel raising and lowering mechanisms pivot about their respective transverse bars, said first damping means being pivotally connected at one end to the panel raising transverse bar, the other end of the damping means being rigidly connected to one of the first pair of frame uprights, said second damping means being pivotally connected at one end to the panel lowering transverse bar, the other end of said second damping means being rigidly connected to one of the second pair of frame uprights; and switch means disposed on said conveyor and responsive to the presence of the panel, said switch means being operatively connected to said drive means.

11. An apparatus for inverting a panel member comprising:

a conveyor for transporting the panel in a horizontal direction, said conveyor including a plurality of spaced apart substantially parallel endless belts;

a frame member including first and second pairs of opposed uprights disposed above the conveyor and enclosing said conveyor;

a panel raising mechanism for engaging the leading edge of the panel as the panel moves along the conveyor, said panel raising mechanism including a transverse bar rotatably mounted above the conveyor on the second pair of opposed frame uprights, a plurality of spaced apart extension members rigidly connected to said transverse bar, and roller means rotatably connected to the free end of each of said extension members, said roller means being spaced apart from each other such that each of said roller means can fit in the space between the adjacent conveyor belts;

means separate from the panel for pivoting said panel raising rollers about their respective transverse bar above and below the conveyor;

a panel lowering mechanism for engaging the leading edge of the panel after the panel has been raised past the vertical, said panel lowering mechanism including a transverse bar rotatably mounted above the conveyor on the first pair of opposed frame uprights, a plurality of spaced apart extension members rigidly connected to said transverse bar, and roller means rotatably connected to the free end of each extension member, said roller means being spaced apart from each other such that each can fit in the space between adjacent conveyor belts, said panel lowering mechanism being disposed opposite said panel raising mechanism such that the extension members of said mechanisms extend towards each other wherein the means separate from the panel for pivoting said panel lowering rollers about their respective transverse bar above and below the conveyor comprises a cam plate rotatably mounted on a shaft, said shaft being connected to the frame, said shaft further being connected to a drive motor, said cam plate including on one face thereof a cam surface, said means further including a link member rigidly connected at one end to the panel lowering mechanism transverse bar, the other end of said link member being pivotally connected to an extension lever, a cam lever being pivotally connected at one end to the other end of said extension lever the other end of said cam lever having a cam follower engaging the cam surface of the cam plate such that as the cam plate rotates the cam follower transverses the path of the cam surface and imparts a pivoting motion to the panel lowering mechanism through the cam lever, the extension lever, and the link member connected thereto;

means separate from the panel for pivoting said panel lowering rollers about their respective transverse bar above and below the conveyor;

means responsive to the presence of the panel for actuating said apparatus; and a means separate from said panel for coordinating said panel raising and lowering mechanisms such that when the leading edge of the panel first engages the panel raising mechanism the rollers of said panel raising mechanism are disposed below the conveyor and the rollers of the panel lowering mechanism are disposed above the conveyor, and such that when the panel raising mechanism has raised the panel to a vertical position the rollers of both the panel raising and panel lowering mechanisms are disposed above the conveyor, and such that when the panel lowering mechanism deposits the leading edge of the panel back onto the conveyor the rollers of said panel lowering mechanism are disposed below the conveyor while the panel raising rollers are disposed above the conveyor.

12. An apparatus for inverting a panel as recited in claim 11 in which the cam lever is pivotally connected to the frame to prevent movement of the cam lever in a direction normal to the surface of the cam plate.

* * * * *

UNITED STATES PATENT AND TRADEMARK OFFICE
CERTIFICATE OF CORRECTION

PATENT NO. : 4,175,655
DATED : November 27, 1979
INVENTOR(S) : Arthur M. Baldwin It is certified that error appears in the above-identified patent and that said Letters Patent are hereby corrected as shown below:

In Column 7, line 37, delete "of" and insert in lieu thereof -- to --.

Signed and Sealed this

Twenty-fourth Day of March 1981

[SEAL]

Attest:

RENE D. TEGTMEYER

Attesting Officer

Acting Commissioner of Patents and Trademarks